United States Patent
Ku et al.

(10) Patent No.: US 9,300,225 B2
(45) Date of Patent: Mar. 29, 2016

(54) SOLAR PHOTOVOLTAIC POWER CONVERSION SYSTEM AND METHOD OF OPERATING THE SAME

(71) Applicant: DELTA ELECTRONICS, INC., Taoyuan County (TW)

(72) Inventors: Chen-Wei Ku, Taoyuan County (TW); Wei-Lun Hsin, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 214 days.

(21) Appl. No.: 14/108,438

(22) Filed: Dec. 17, 2013

(65) Prior Publication Data

US 2015/0103575 A1     Apr. 16, 2015

(30) Foreign Application Priority Data

Oct. 11, 2013 (TW) .............................. 102136695 A

(51) Int. Cl.
*H02M 7/5387* (2007.01)
*H02M 7/48* (2007.01)

(52) U.S. Cl.
CPC .............. *H02M 7/5387* (2013.01); *H02M 7/48* (2013.01)

(58) Field of Classification Search
CPC .................... H02M 7/5387; H02M 2001/4822
USPC .................................................. 363/71, 132
See application file for complete search history.

(56) References Cited

U.S. PATENT DOCUMENTS

| | | | | |
|---|---|---|---|---|
| 5,229,928 A * | 7/1993 | Karlsson | ............. | H02M 3/3376 363/131 |
| 6,574,125 B2 * | 6/2003 | Matsukawa | ....... | H02M 3/33569 363/132 |
| 9,019,736 B2 * | 4/2015 | Lee | ...................... | H02M 7/5387 363/131 |
| 2011/0013438 A1 | 1/2011 | Frisch et al. | | |
| 2012/0002450 A1 * | 1/2012 | Mueller | .................. | H02M 1/44 363/71 |
| 2013/0016543 A1 * | 1/2013 | Ku | ..................... | H02M 7/53871 363/71 |

(Continued)

FOREIGN PATENT DOCUMENTS

| | | |
|---|---|---|
| CN | 101145740 | 3/2008 |
| CN | 100596011 | 3/2010 |

(Continued)

OTHER PUBLICATIONS

Liu et al., "A Novel Hysteresis Current Controlled Dual Buck Half Bridge Inverter", Power Electronics Specialist conference, 2003; PESC '03 IEEE 34th Annual, vol. 4, 2003, pp. 1615-1620. (The relevant Parts: Fig. 2 and its Introduction paragraph.).

(Continued)

*Primary Examiner* — Jeffrey Sterrett
(74) *Attorney, Agent, or Firm* — Hauptman Ham, LLP

(57) ABSTRACT

A solar photovoltaic power conversion system is provided to convert a DC input voltage into an AC output voltage, which mainly includes an input capacitor bank, a first switching circuit, a second switching circuit, a first filtering circuit, a second filtering circuit, and a control circuit. The first switching circuit has a first power switch and a second power switch. The second switching circuit has a third power switch and a fourth power switch. The control circuit produces a first control signal, a second control signal, a third control signal, and a fourth control signal to respectively control the first power switch, the second power switch, the third power switch, and the fourth power switch so as to reduce leakage current of the DC input voltage caused by parasitic capacitance voltage.

20 Claims, 10 Drawing Sheets

(56) References Cited

U.S. PATENT DOCUMENTS

| | | | |
|---|---|---|---|
| 2015/0103575 A1* | 4/2015 | Ku | H02M 7/5387 363/132 |
| 2015/0256104 A1* | 9/2015 | Fu | H02M 7/537 363/131 |

FOREIGN PATENT DOCUMENTS

| | | |
|---|---|---|
| CN | 102223101 | 10/2011 |
| CN | 102891619 | 1/2013 |
| EP | 2546973 | 1/2013 |
| JP | H09308263 | 11/1997 |
| JP | 2013009478 | 1/2013 |
| TW | 201320577 | 5/2013 |

OTHER PUBLICATIONS

European search report dated Apr. 2, 2014 from corresponding No. EP 13198717.4.

Office Action dated Nov. 4, 2014 from corresponding No. JP 2013-257347.

Office Action dated Apr. 21, 2015 from corresponding No. TW 102136695.

* cited by examiner

SOLAR PHOTOVOLTAIC POWER CONVERSION SYSTEM AND METHOD OF OPERATING THE SAME

BACKGROUND

1. Technical Field

The present disclosure relates generally to a solar photovoltaic power conversion system and a method of operating the same, and more particularly to a solar photovoltaic power conversion system and a method of operating the same which are provided to reduce leakage current of a DC input voltage caused by parasitic capacitance voltage.

2. Description of Related Art

Reference is made to FIG. 1 which is a block diagram of a related art dual-buck inverter. The dual-buck inverter receives a DC input voltage Vdc, and converts the DC input voltage Vdc into an AC output voltage Vac. The dual-buck inverter includes two buck circuits, namely, a first buck circuit BC1 and a second buck circuit BC2. The first buck circuit BC1 mainly has a first bridge arm Lg1a and a second bridge arm Lg2a. The first bridge arm Lg1a has a first switch S1a and a first diode D1a connected in series to the first switch S1a. The second bridge arm Lg2a has a second switch S2a and a second diode D2a connected in series to the second switch S2a. The second buck circuit BC2 mainly has a third bridge arm Lg3a and a fourth bridge arm Lg4a. The third bridge arm Lg3a has a third switch S3a and a third diode D3a connected in series to the third switch S3a. The fourth bridge arm Lg4a has a fourth switch S4a and a fourth diode D4a connected in series to the fourth switch S4a. Also, the first buck circuit BC1 and the second buck circuit BC2 are connected in parallel to an input capacitor C1a.

Reference is made to FIG. 2 which is a schematic waveform graph of driving signals for controlling the related art dual-buck inverter. A driving signal generating circuit (not shown) is provided to produce a plurality of control signals, namely a first control signal Sca1, a second control signal Sca2, a third control signal Sca3, and a fourth control signal Sca4 to correspondingly control the first switch S1a, the second switch S2a, the third switch S3a, and the fourth switch S4a.

The first control signal Sca1 and the second control signal Sca2 are a complementary low-frequency signal pair. When the AC output voltage Vac is under a positive half-cycle operation (during a time interval between time t0 and time t1), the first control signal Sca1 turns on the first switch S1a and the second control signal Sca2 turns off the second switch S2a, and the third control signal Sca3 turns off the third switch S3a and the fourth control signal Sca4 controls the fourth switch S4a in the high-frequency switching manner. When the AC output voltage Vac is under a negative half-cycle operation (during a time interval between time t1 and time t2), the first control signal Sca1 turns off the first switch S1a and the second control signal Sca2 turns on the second switch S2a, and the third control signal Sca3 controls the third switch S3a in the high-frequency switching manner and the fourth control signal Sca4 turns off the fourth switch S4a.

However, the leakage current Icp1, Icp2 would be rapidly changed once the parasitic capacitance voltage of the parasitic capacitances Cp1, Cp2 significantly change because of the large variation of the AC output voltage Vac of the dual-buck inverter. That is, the leakage current gets larger as the variation of the parasitic capacitance voltage gets larger.

Accordingly, it is desirable to provide a solar photovoltaic power conversion system and a method of operating the same to control a dual-buck inverter having two switching circuits and two filtering circuits so as to provide energy-storing and energy-releasing loops of output inductors and connect the filtering circuits to a neutral point at a DC input side, thus significantly reducing leakage current of a DC input voltage caused by parasitic capacitance voltage.

SUMMARY

An object of the present disclosure is to provide a solar photovoltaic power conversion system to solve the above-mentioned problems. Accordingly, the solar photovoltaic power conversion system is provided to convert a DC input voltage into an AC output voltage. The solar photovoltaic power conversion system includes an input capacitor bank, a first switching circuit, a second switching circuit, a first filtering circuit, a second filtering circuit, and a control circuit.

The input capacitor bank has a first capacitor and a second capacitor, and the first capacitor and the second capacitor are connected to a neutral point and configured to receive the DC input voltage. The first switching circuit is connected in parallel to the input capacitor bank, and the first switching circuit has a first bridge arm and a second bridge arm connected in parallel to the first bridge arm. The second switching circuit is connected in parallel to the input capacitor bank, and the second switching circuit has a third bridge arm and a fourth bridge arm connected in parallel to the third bridge arm. The first filtering circuit is connected to the first switching circuit, and an output side of the first filtering circuit is connected to the neutral point. The second filtering circuit is connected to the second switching circuit, and an output side of the second filtering circuit connected to the neutral point. The control circuit is configured to produce a plurality of control signals to control the first switching circuit and the second switching circuit, respectively, to reduce leakage current of the DC input voltage caused by parasitic capacitance voltage.

Another object of the present disclosure is to provide a method of operating a solar photovoltaic power conversion system to solve the above-mentioned problems. Accordingly, the solar photovoltaic power conversion system converts a DC input voltage into an AC output voltage, and the method includes following steps: (a) providing an input capacitor bank to receive the DC input voltage; wherein the input capacitor bank has a first capacitor and a second capacitor, and the first capacitor and the second capacitor are connected to a neutral point; (b) providing a first switching circuit connected in parallel to the input capacitor bank; wherein the first switching circuit has a first bridge arm and a second bridge arm connected in parallel to the first bridge arm; (c) providing a second switching circuit connected in parallel to the input capacitor bank; wherein the second switching circuit has a third bridge arm and a fourth bridge arm connected in parallel to the third bridge arm; (d) providing a first filtering circuit; wherein the first filtering circuit is connected to the first switching circuit and an output side of the first filtering circuit is connected to the neutral point; (e) providing a second filtering circuit; wherein the second filtering circuit is connected to the second switching circuit and an output side of the second filtering circuit is connected to the neutral point; and (f) providing a control circuit to produce a plurality of control signals to control the first switching circuit and the second switching circuit, respectively, to reduce leakage current of the DC input voltage caused by parasitic capacitance voltage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
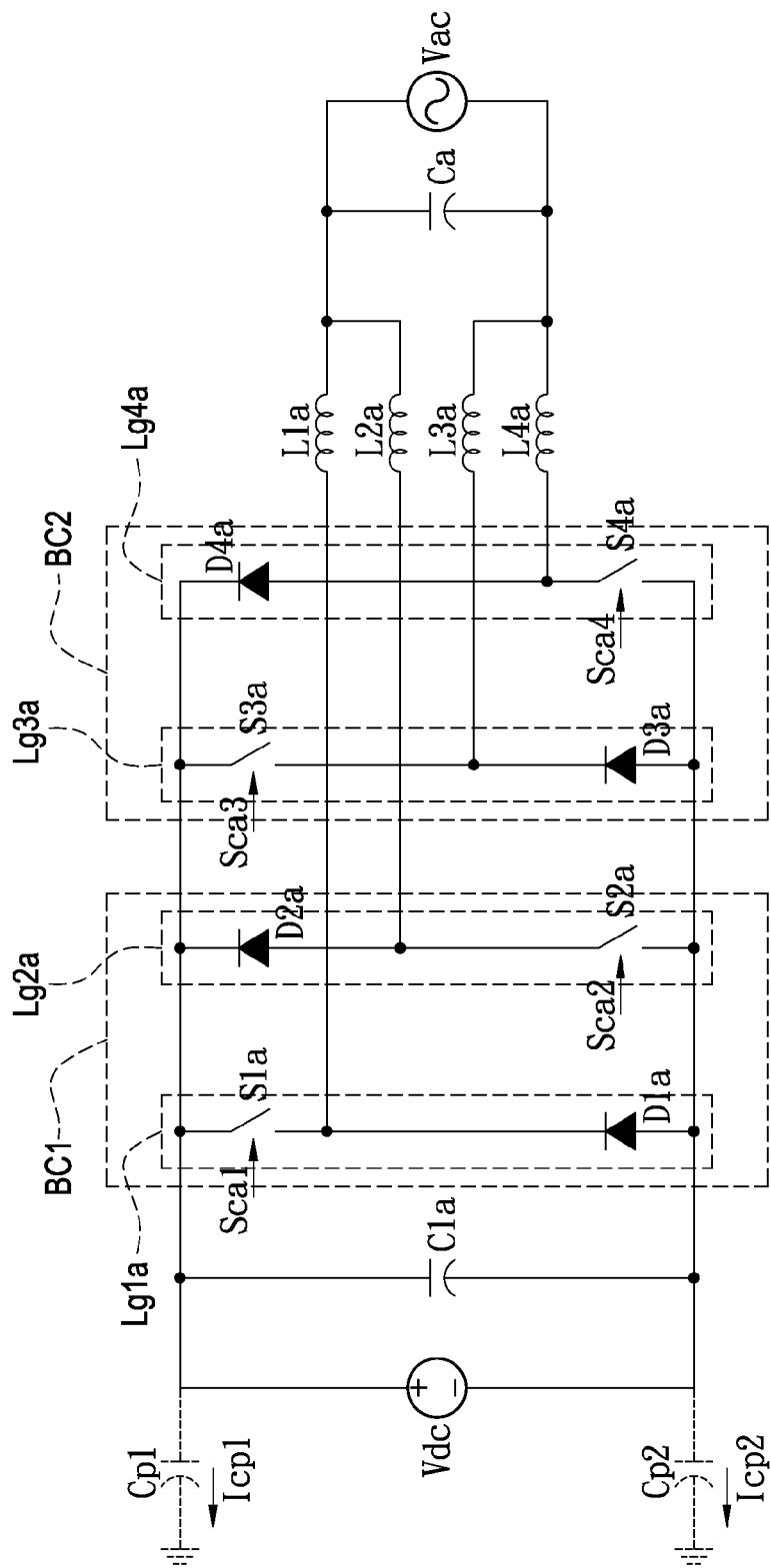
FIG. 1 is a block diagram of a related art dual-buck inverter.
Figure 2:
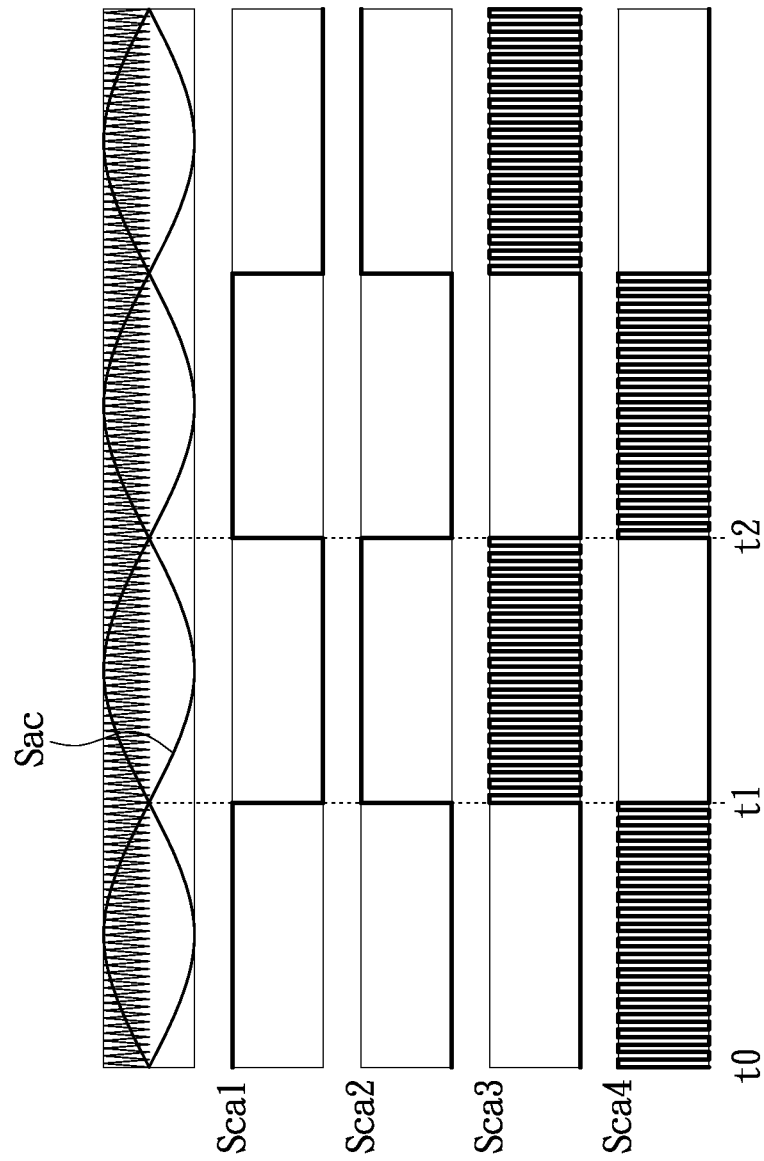
FIG. 2 is a schematic waveform graph of driving signals for controlling the related art dual-buck inverter.

Reference will now be made to the drawing figures to describe the present invention in detail.

Figure 3:
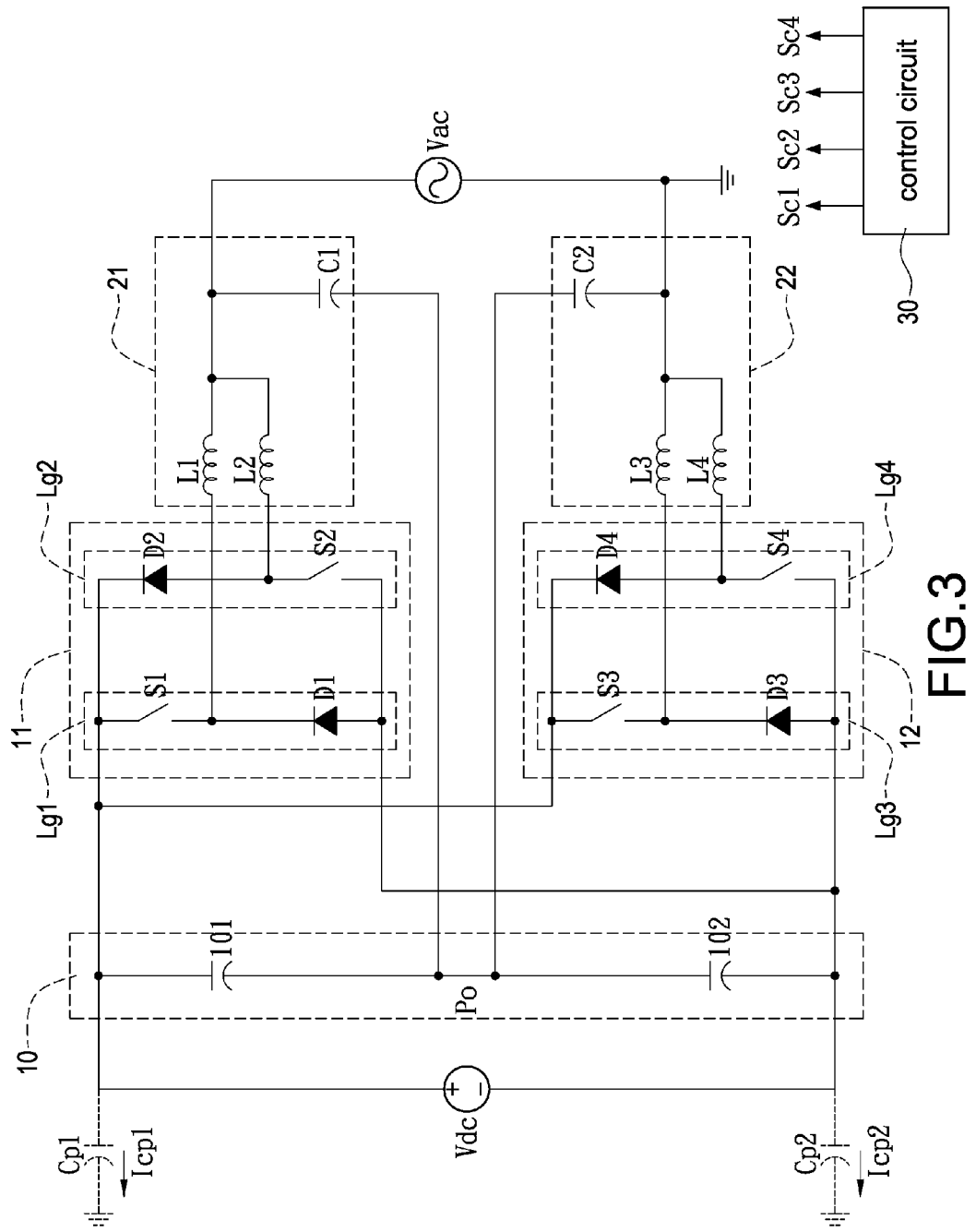
FIG. 3 is a circuit diagram of a solar photovoltaic power conversion system according to the present disclosure.

Reference is made to FIG. 3 which is a circuit diagram of a solar photovoltaic power conversion system according to the present disclosure. The solar photovoltaic power conversion system is provided to convert a DC input voltage Vdc into an AC output voltage Vac. The solar photovoltaic power conversion system includes an input capacitor bank 10, a first switching circuit 11, a second switching circuit 12, a first filtering circuit 21, a second filtering circuit 22, and a control circuit 30. The input capacitor bank 10 has a first capacitor 101 and a second capacitor 102. The first capacitor 101 and the second capacitor 102 are connected to a neutral point Po and receive the DC input voltage Vdc. In particular, the first capacitor 101 and the second capacitor 102 are connected to the neutral point Po to maintain a voltage across the first capacitor 101 and a voltage across the second capacitor 102 are equal to a half of the DC input voltage Vdc. The first switching circuit 11 is connected in parallel to the input capacitor bank 10. The first switching circuit 11 has a first bridge arm Lg1 and a second bridge arm Lg2 connected in parallel to the first bridge arm Lg1. The first bridge arm Lg1 is composed of a first power switch S1 and a first diode D1 connected in series to the first power switch S1, and the second bridge arm Lg2 is composed of a second power switch S2 and a second diode D2 connected in series to the second power switch S2. The second switching circuit 12 is connected in parallel to the input capacitor bank 10. The second switching circuit 12 has a third bridge arm Lg3 and a fourth bridge arm Lg4 connected in parallel to the third bridge arm Lg3. The third bridge arm Lg3 is composed of a third power switch S3 and a third diode D3 connected in series to the third power switch S3, and the fourth bridge arm Lg4 is composed of a fourth power switch S4 and a fourth diode D4 connected in series to the fourth power switch S4.

The first filtering circuit 21 has a first output inductor L1, a second output inductor L2, and a first output capacitor C1. The first output inductor L1 has a first terminal and a second terminal, the second output inductor L2 has a first terminal and a second terminal, and the first output capacitor C1 has a first terminal and a second terminal. The first terminal of the first output inductor L1 is connected to the first terminal of the second output inductor L2 and connected to the first terminal of the first output capacitor C1. The second terminal of the first output inductor L1 is connected to the first power switch S1 and the first diode D1, and the second terminal of the second output inductor L2 is connected to the second power switch S2 and the second diode D2. The second terminal of the first output capacitor C1 is connected to the neutral point Po. The second filtering circuit 22 has a third output inductor L3, a fourth output inductor L4, and a second output capacitor C2. The third output inductor L3 has a first terminal and a second terminal, the fourth output inductor L4 has a first terminal and a second terminal, and the second output capacitor C2 has a first terminal and a second terminal. The first terminal of the third output inductor L3 is connected to the first terminal of the fourth output inductor L4 and connected to the first terminal of the second output capacitor C2. The second terminal of the third output inductor L3 is connected to the third power switch S3 and the third diode D3, and the second terminal of the fourth output inductor L4 is connected to the fourth power switch S4 and the fourth diode D4. The second terminal of the second output capacitor C2 is connected to the neutral point Po. The AC output voltage Vac is outputted between the first terminal of the first output capacitor C1 and the first terminal of the second output capacitor C2. The control circuit 30 produces a first control signal Sc1, a second control signal Sc2, a third control signal Sc3, and a fourth control signal Sc4 to correspondingly control the first power switch S1, the second power switch S2, the third power switch S3, and the fourth power switch S4 to reduce leakage current of the DC input voltage Vdc caused by parasitic capacitance voltage. The detailed operation of the solar photovoltaic power conversion system will be described hereinafter as follows.

Figure 4:
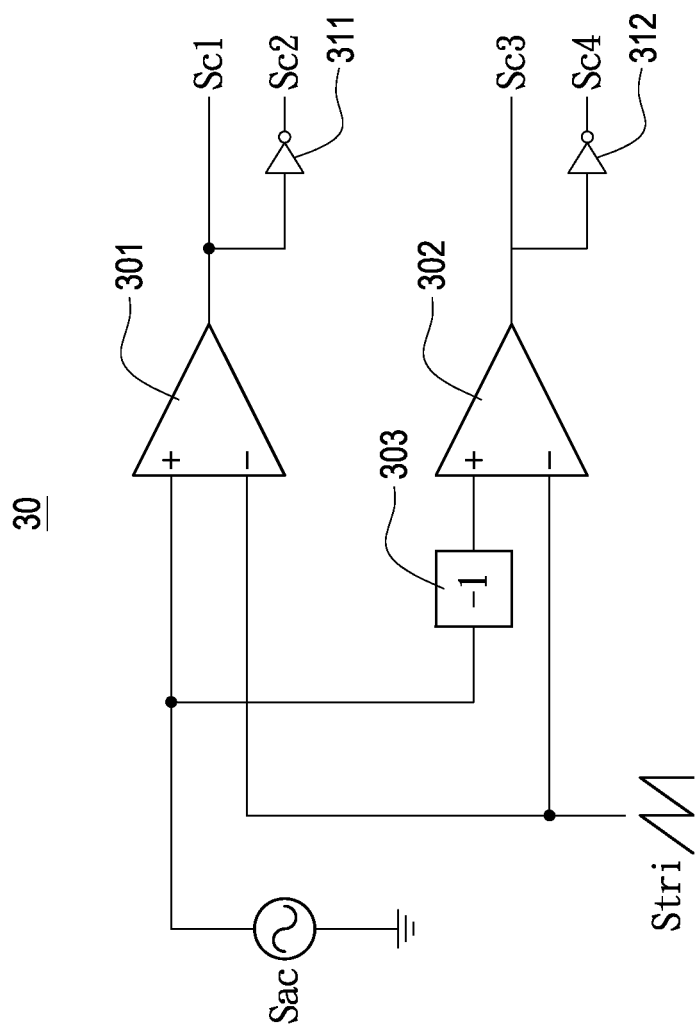
FIG. 4 is a schematic circuit diagram of a control circuit of the solar photovoltaic power conversion system according to the present disclosure.

Reference is made to FIG. 4 which is a schematic circuit diagram of a control circuit of the solar photovoltaic power conversion system according to the present disclosure. The control circuit 30 includes a signal inverting unit 303, a first not gate unit 311, a second not gate unit 312, a first comparison unit 301, and a second comparison unit 302. The first comparison unit 301 has an inverting input terminal, a non-inverting input terminal, and an output terminal. The non-inverting input terminal receives an AC output voltage signal Sac provided from the AC output voltage Vac and the inverting input terminal receives a triangular carrier signal Stri. The output terminal outputs the first control signal Sc1, and the output terminal is connected to the first not gate unit 311 to output the second control signal Sc2. The triangular carrier signal Stri is a high-frequency carrier signal. The second comparison unit 302 has an inverting input terminal, a non-inverting input terminal, and an output terminal. The non-inverting input terminal is connected to the signal inverting unit 303 and receives the AC output voltage signal Sac and the inverting input terminal receives the triangular carrier signal Stri. The output terminal outputs the third control signal Sc3, and the output terminal is connected to the second not gate unit 312 to output the fourth control signal Sc4.

Figure 5:
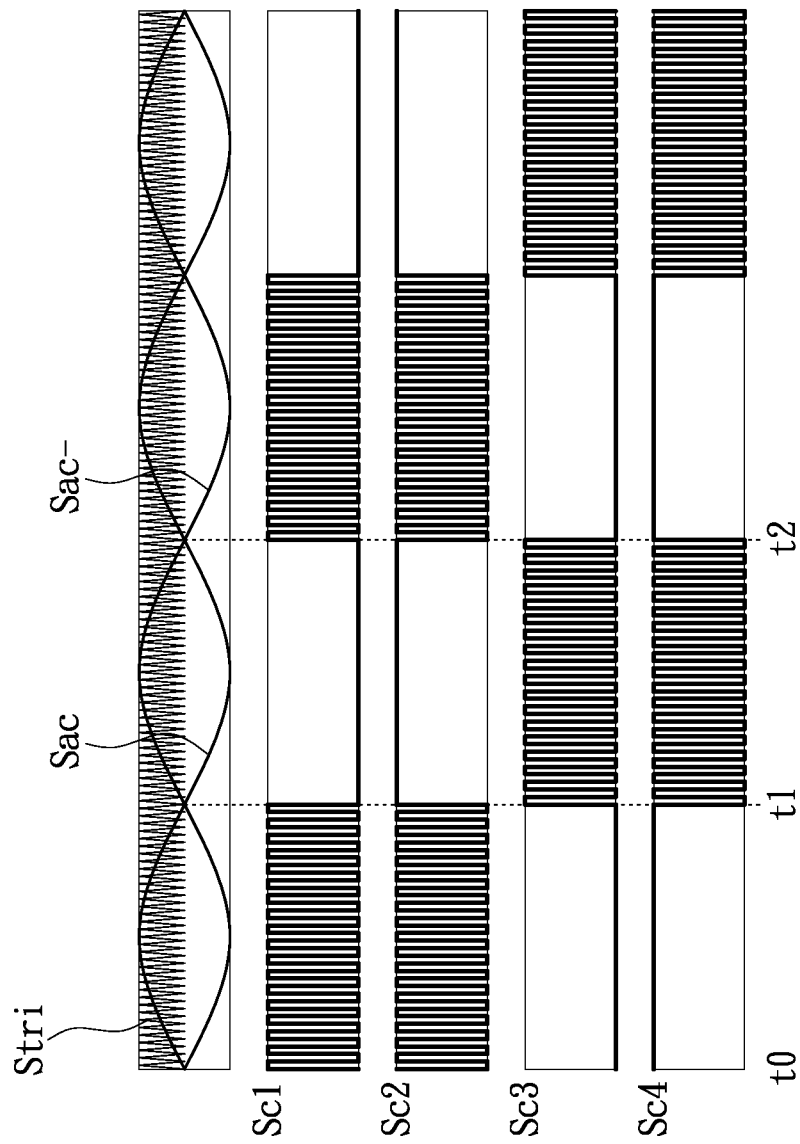
FIG. 5 is a schematic waveform graph of control signals for controlling the solar photovoltaic power conversion system according to the present disclosure.

Reference is made to FIG. 5 which is a schematic waveform graph of control signals for controlling the solar photovoltaic power conversion system according to the present disclosure. When the AC output voltage Vac is under a positive half-cycle operation (during a time interval between time t0 and time t1), the first control signal Sc1 and the second control signal Sc2 is a complementary high-frequency switching signal pair, and the third control signal Sc3 and the fourth control signal Sc4 is a complementary low-frequency signal pair. When the AC output voltage Vac is under a negative half-cycle operation (during a time interval between time t1 and time t2), the first control signal Sc1 and the second control signal Sc2 is a complementary low-frequency signal pair, and the third control signal Sc3 and the fourth control signal Sc4 is a complementary high-frequency switching signal pair.

More specifically, when the AC output voltage Vac is under the positive half-cycle operation, the AC output voltage signal Sac is compared with the triangular carrier signal Stri by the first comparison unit 301 to produce the first control signal Sc1 which is a pulse width modulation (PWM) signal. In addition, the first not gate unit 311 is provided to convert the first control signal Sc1 into the second control signal Sc2 which is also a PWM signal. In particular, the second control signal Sc2 and the first control signal Sc1 are the complementary high-frequency switching signals, that is, when the first control signal Sc1 is high-level, the second control signal Sc2 is low-level; on the contrary, when the first control signal Sc1 is low-level, the second control signal Sc2 is high-level. Especially, the switching frequency of the PWM signal is equal to the frequency of the triangular carrier signal Stri. In addition, the frequency of converting the third control signal Sc3 and the fourth control signal Sc4 is equal to the utility frequency of the AC output voltage signal Sac.

Similarly, when the AC output voltage Vac is under the negative half-cycle operation, the AC output voltage signal Sac is converted to produce an inverting AC output voltage signal Sac- by the signal inverting unit 303, and the inverting AC output voltage signal Sac- is compared with the triangular carrier signal Stri by the second comparison unit 302 to produce the third control signal Sc3 which is a PWM signal. In addition, the second not gate unit 312 is provided to convert the third control signal Sc3 into the fourth control signal Sc4 which is also a PWM signal. In particular, the fourth control signal Sc4 and the third control signal Sc3 are the complementary high-frequency switching signals, that is, when the third control signal Sc3 is high-level, the fourth control signal Sc4 is low-level; on the contrary, when the third control signal Sc3 is low-level, the fourth control signal Sc4 is high-level. Especially, the switching frequency of the PWM signal is equal to the frequency of the triangular carrier signal Stri. In addition, the frequency of converting the first control signal Sc1 and the second control signal Sc2 is equal to the utility frequency of the AC output voltage signal Sac.

Figure 6:
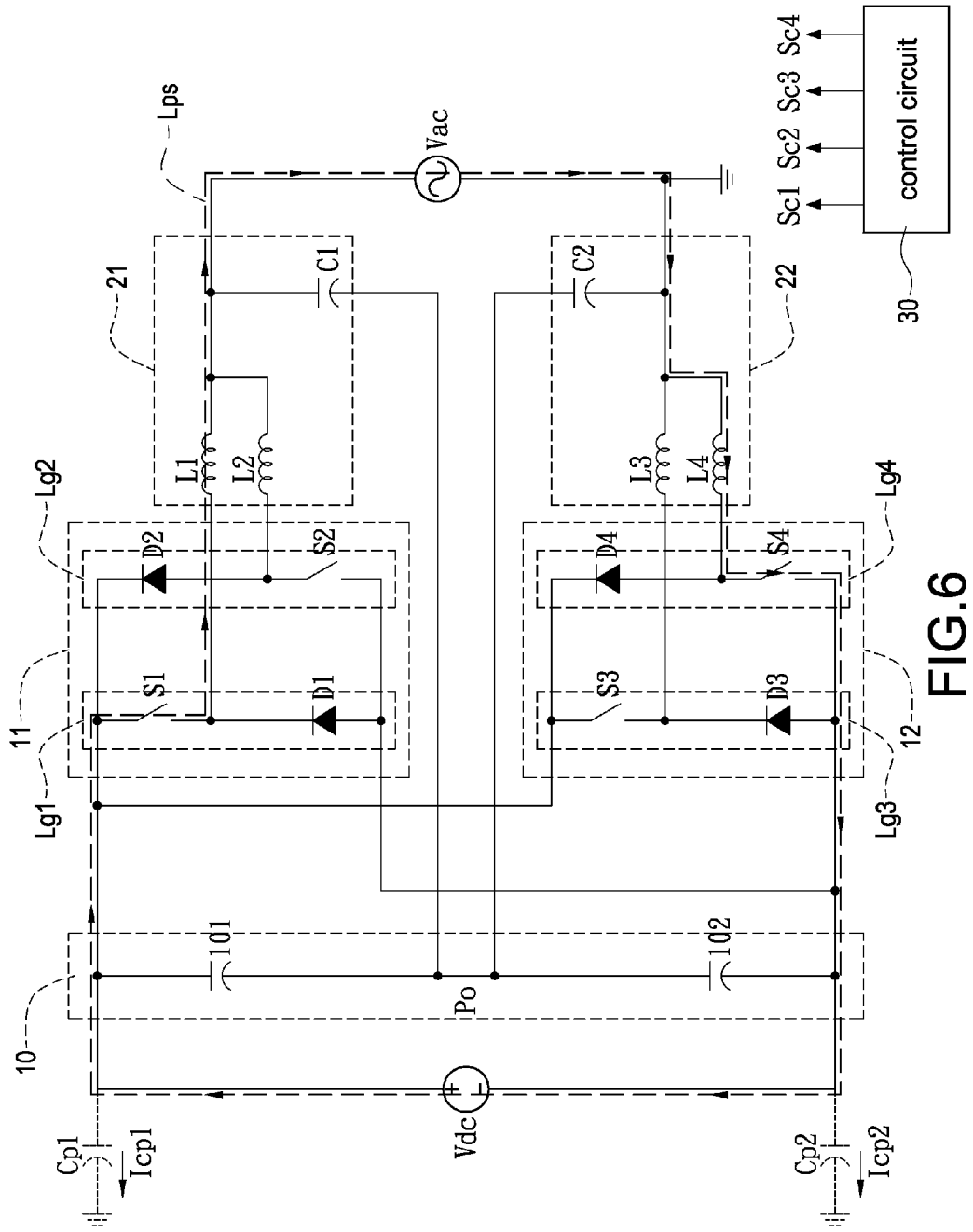
FIG. 6 is a circuit diagram of the solar photovoltaic power conversion system under a positive half-cycle energy-storing operation according to the present disclosure.

Reference is made to FIG. 6 which is a circuit diagram of the solar photovoltaic power conversion system under a positive half-cycle energy-storing operation according to the present disclosure. When the AC output voltage Vac is under the positive half-cycle operation, and the first power switch S1 is turned on by the first control signal Sc1 in the high-frequency switching manner and the fourth power switch S4 is turned on by the fourth control signal Sc4 in the low-frequency high-level manner, the first output inductor L1 and the fourth output inductor L4 are under the energy-storing operation through a positive half-cycle energy-storing loop Lps sequentially formed by the DC input voltage Vdc, the first power switch S1, the first output inductor L1, the AC output voltage Vac, the fourth output inductor L4, the fourth power switch S4, and the DC input voltage Vdc.

Figure 7:
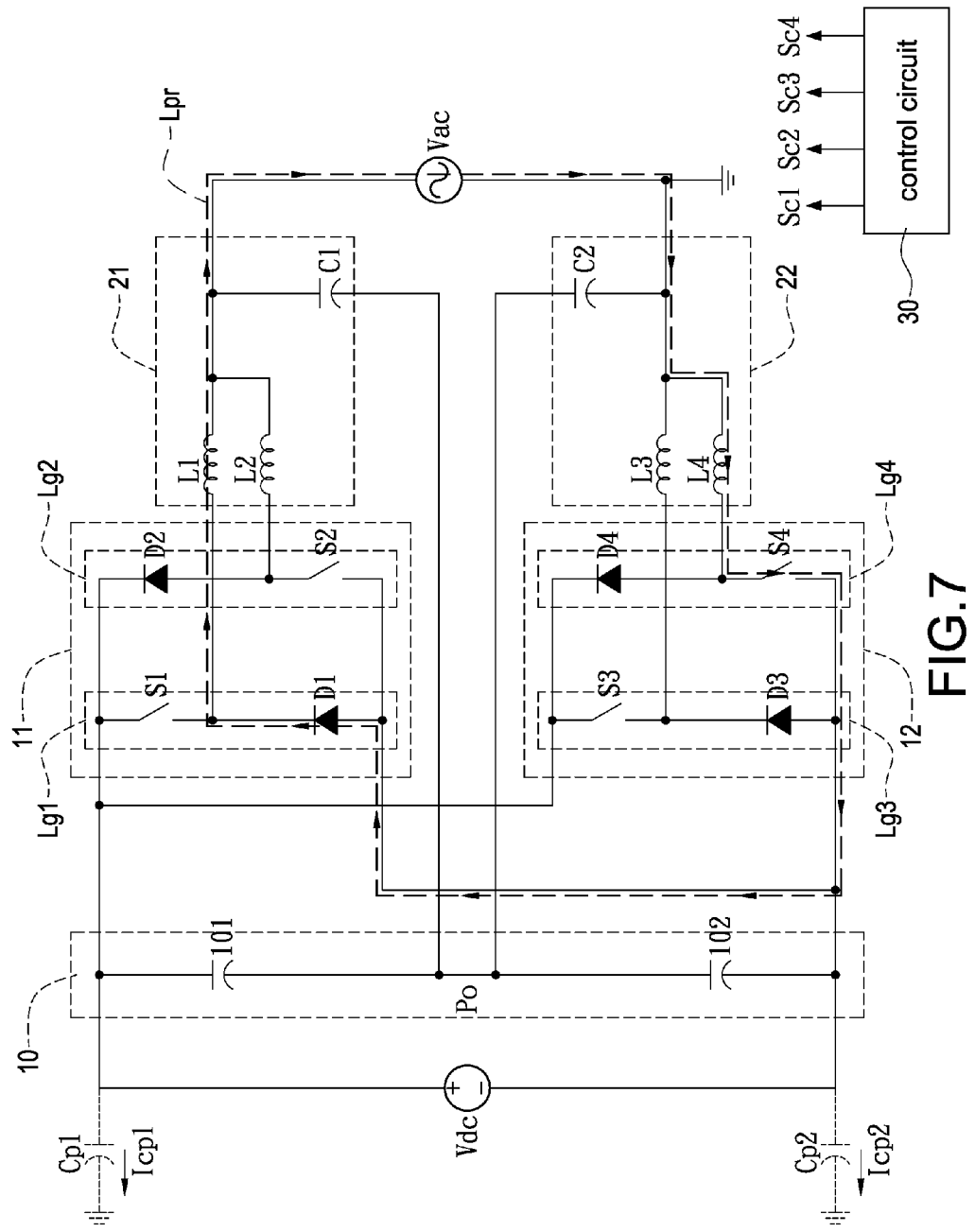
FIG. 7 is a circuit diagram of the solar photovoltaic power conversion system under a positive half-cycle energy-releasing operation according to the present disclosure.

Reference is made to FIG. 7 which is a circuit diagram of the solar photovoltaic power conversion system under a positive half-cycle energy-releasing operation according to the present disclosure. When the AC output voltage Vac is under the positive half-cycle operation, and the first power switch S1 is turned off by the first control signal Sc1 in the high-frequency switching manner and the fourth power switch S4 is turned on by the fourth control signal Sc4 in the low-frequency high-level manner, the first output inductor L1 and the fourth output inductor L4 are under the energy-releasing operation through a positive half-cycle energy-releasing loop Lpr sequentially formed by the first output inductor L1, the AC output voltage Vac, the fourth output inductor L4, the fourth power switch S4, the first diode D1, and the first output inductor L1.

Figure 8:
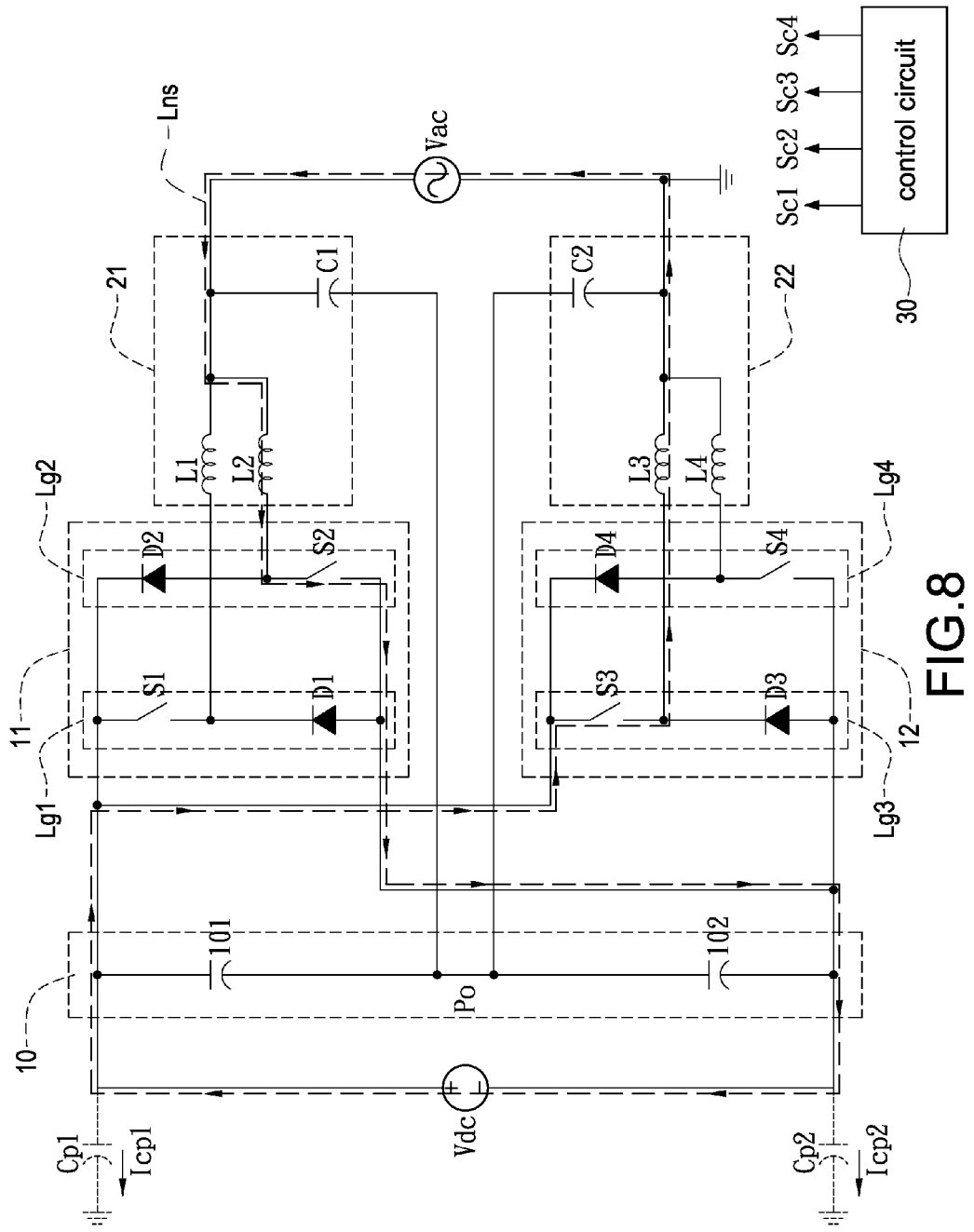
FIG. 8 is a circuit diagram of the solar photovoltaic power conversion system under a negative half-cycle energy-storing operation according to the present disclosure.

Reference is made to FIG. 8 which is a circuit diagram of the solar photovoltaic power conversion system under a negative half-cycle energy-storing operation according to the present disclosure. When the AC output voltage Vac is under the negative half-cycle operation, and the third power switch S3 is turned on by the third control signal Sc3 in the high-frequency switching manner and the second power switch S2 is turned on by the second control signal Sc2 in the low-frequency high-level manner, the third output inductor L3 and the second output inductor L2 are under the energy-storing operation through a negative half-cycle energy-storing loop Lns sequentially formed by the DC input voltage Vdc, the third power switch S3, the third output inductor L3, the AC output voltage Vac, the second output inductor L2, the second power switch S2, and the DC input voltage Vdc.

Figure 9:
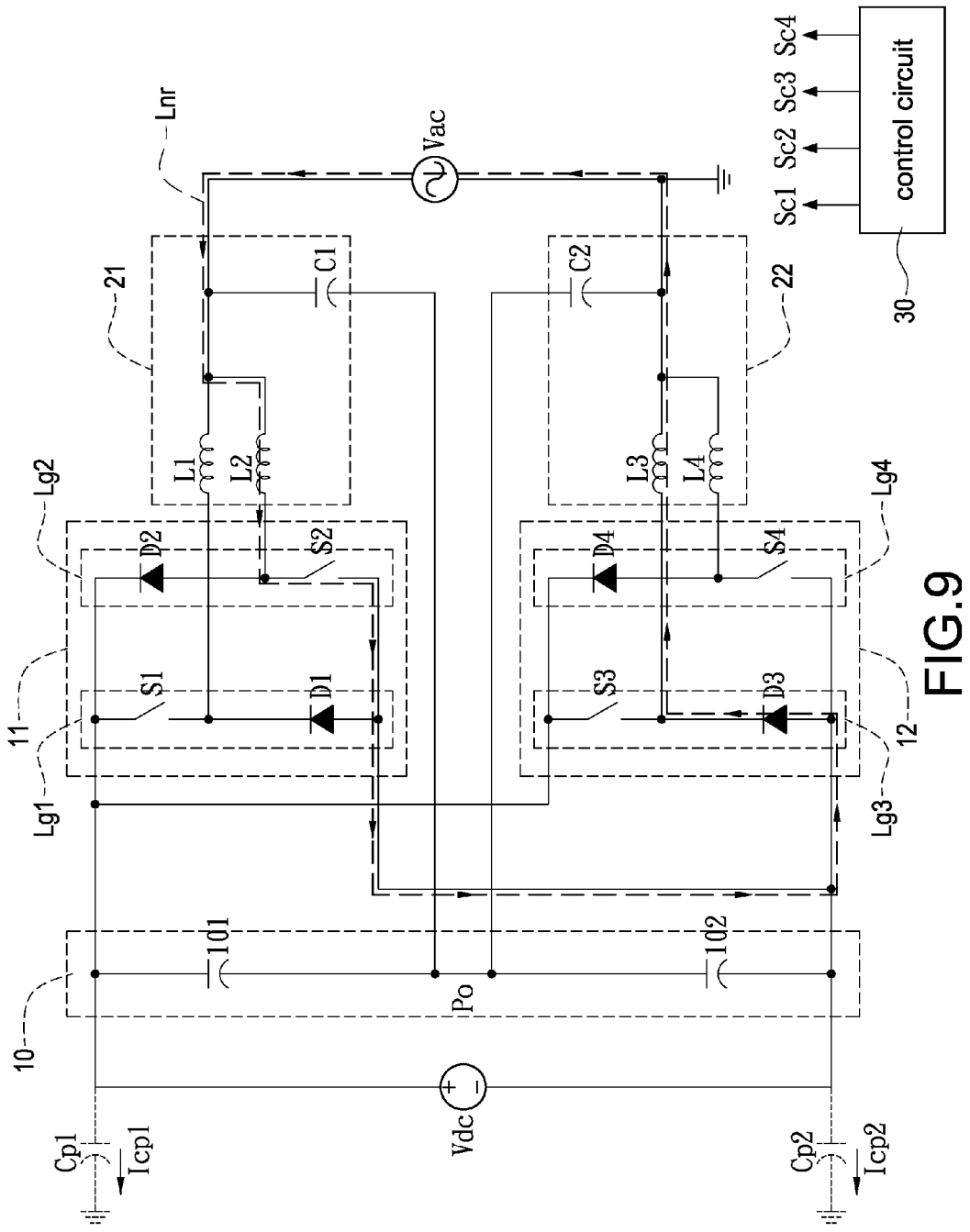
FIG. 9 is a circuit diagram of the solar photovoltaic power conversion system under a negative half-cycle energy-releasing operation according to the present disclosure.

Reference is made to FIG. 9 which is a circuit diagram of the solar photovoltaic power conversion system under a negative half-cycle energy-releasing operation according to the present disclosure. When the AC output voltage Vac is under the negative half-cycle operation, and the third power switch S3 is turned off by the third control signal Sc3 in the high-frequency switching manner and the second power switch S2 is turned on by the second control signal Sc2 in the low-frequency high-level manner, the third output inductor L3 and the second output inductor L2 are under the energy-releasing operation through a negative half-cycle energy-releasing loop Lnr sequentially formed by the third output inductor L3, the AC output voltage Vac, the second output inductor L2, the second power switch S2, the third diode D3, and the third output inductor L3.

Figure 10:
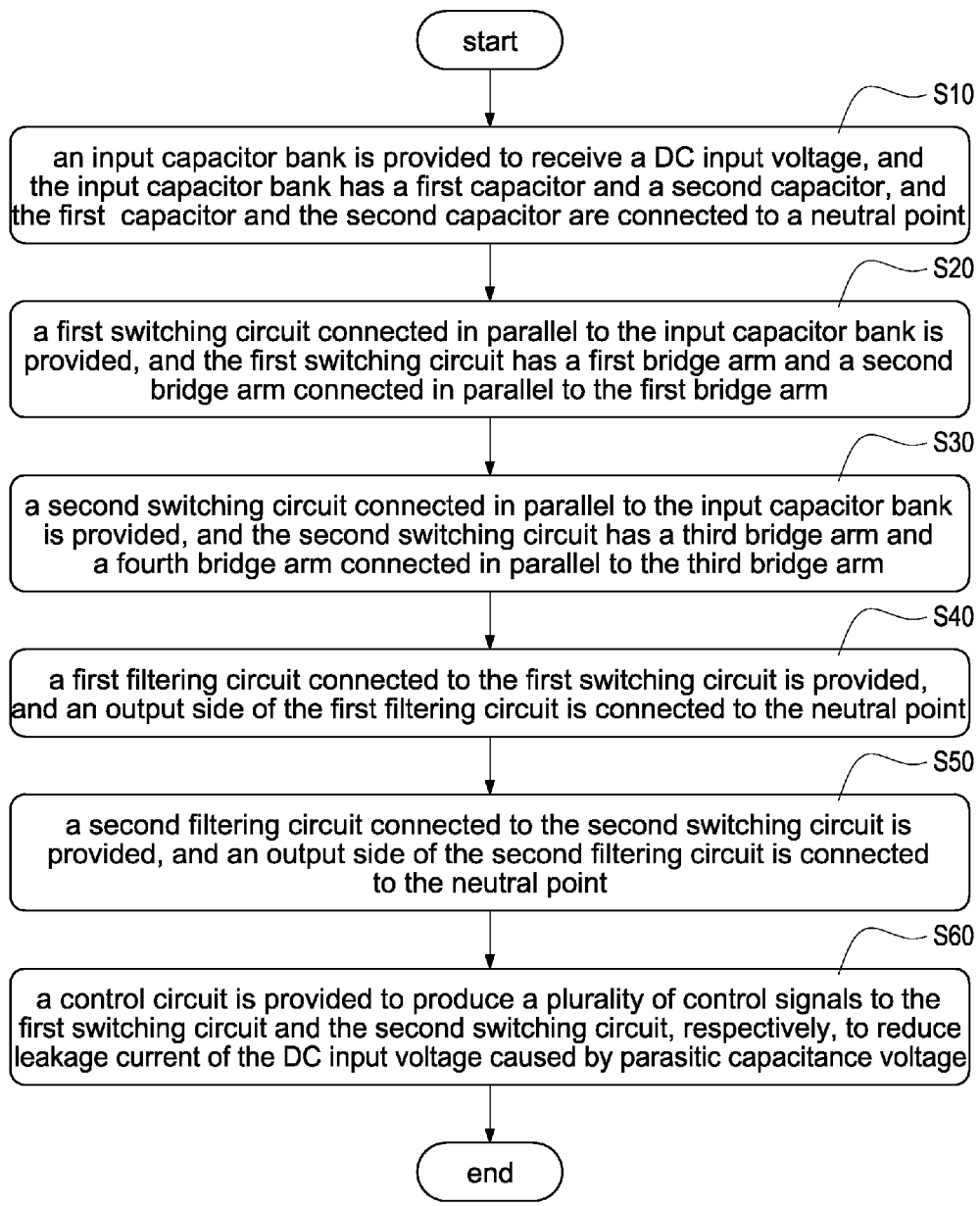
FIG. 10 is a flowchart of a method of operating a solar photovoltaic power conversion system according to the present disclosure.

Reference is made to FIG. 10 which is a flowchart of a method of operating a solar photovoltaic power conversion system according to the present disclosure. The solar photovoltaic power conversion system is provided to convert a DC input voltage into an AC output voltage. The method includes following steps. First, an input capacitor bank is provided to receive the DC input voltage. The input capacitor bank has a first capacitor and a second capacitor, and the first capacitor and the second capacitor are connected to a neutral point (S10). Afterward, a first switching circuit connected in parallel to the input capacitor bank is provided. The first switching circuit has a first bridge arm and a second bridge arm connected in parallel to the first bridge arm; the first bridge arm is composed of a first power switch and a first diode connected in series to the first power switch, and the second bridge arm is composed of a second power switch and a second diode connected in series to the second power switch (S20). Afterward, a second switching circuit connected in parallel to the input capacitor bank is provided. The second switching circuit has a third bridge arm and a fourth bridge arm connected in parallel to the third bridge arm; the third bridge arm is composed of a third power switch and a third diode connected in series to the third power switch, and the fourth bridge arm is composed of a fourth power switch and a fourth diode connected in series to the fourth power switch (S30).

Afterward, a first filtering circuit is provided. The first filtering circuit has a first output inductor, a second output inductor, and a first output capacitor. The first output inductor has a first terminal and a second terminal, the second output inductor has a first terminal and a second terminal, and the first output capacitor has a first terminal and a second terminal. The first terminal of the first output inductor is connected to the first terminal of the second output inductor and connected to the first terminal of the first output capacitor. The second terminal of the first output inductor is connected to the first power switch and the first diode, and the second terminal of the second output inductor is connected to the second power switch and the second diode. The second terminal of the first output capacitor is connected to the neutral point (S40). Afterward, a second filtering circuit is provided. The second filtering circuit has a third output inductor, a fourth output inductor, and a second output capacitor. The third output inductor has a first terminal and a second terminal, the fourth output inductor has a first terminal and a second terminal, and the second output capacitor has a first terminal and a second terminal. The first terminal of the third output inductor is connected to the first terminal of the fourth output inductor and connected to the first terminal of the second output capacitor. The second terminal of the third output inductor is connected to the third power switch and the third diode, and the second terminal of the fourth output inductor is connected to the fourth power switch and the fourth diode. The second terminal of the second output capacitor is connected to the neutral point (S50). The AC output voltage is outputted between the first terminal of the first output capacitor and the first terminal of the second output capacitor. Finally, a control circuit is provided to produce a first control signal, a second control signal, a third control signal, and a fourth control signal to correspondingly control the first power switch, the second power switch, the third power switch, and the fourth power switch to reduce leakage current of the DC input voltage caused by parasitic capacitance voltage (S60).

When the AC output voltage is under the positive half-cycle operation, and the first power switch is turned on by the first control signal in the high-frequency switching manner and the fourth power switch is turned on by the fourth control signal in the low-frequency high-level manner, the first output inductor and the fourth output inductor are under the energy-storing operation through a positive half-cycle energy-storing loop sequentially formed by the DC input voltage, the first power switch, the first output inductor, the AC output voltage, the fourth output inductor, the fourth power switch, and the DC input voltage.

When the AC output voltage is under the positive half-cycle operation, and the first power switch is turned off by the first control signal in the high-frequency switching manner and the fourth power switch is turned on by the fourth control signal in the low-frequency high-level manner, the first output inductor and the fourth output inductor are under the energy-releasing operation through a positive half-cycle energy-releasing loop sequentially formed by the first output inductor, the AC output voltage, the fourth output inductor, the fourth power switch, the first diode, and the first output inductor.

When the AC output voltage is under the negative half-cycle operation, and the third power switch is turned on by the third control signal in the high-frequency switching manner and the second power switch is turned on by the second control signal in the low-frequency high-level manner, the third output inductor and the second output inductor are under the energy-storing operation through a negative half-cycle energy-storing loop sequentially formed by the DC input voltage, the third power switch, the third output inductor, the AC output voltage, the second output inductor, the second power switch, and the DC input voltage.

When the AC output voltage is under the negative half-cycle operation, and the third power switch is turned off by the third control signal in the high-frequency switching manner and the second power switch is turned on by the second control signal in the low-frequency high-level manner, the third output inductor and the second output inductor are under the energy-releasing operation through a negative half-cycle energy-releasing loop sequentially formed by the third output inductor, the AC output voltage, the second output inductor, the second power switch, the third diode, and the third output inductor.

In conclusion, the present disclosure has following advantages:

The dual-buck inverter, composed of the first switching circuit 11, the second switching circuit 12, the first filtering circuit 21, and the second filtering circuit 22, is used to provide energy-storing and energy-releasing loops of the first output inductor L1, the second output inductor L2, the third output inductor L3, and the fourth output inductor L4. In addition, the first filtering circuit 21 and the second filtering circuit 22 are connected to the neutral point Po at the DC input side, thus significantly reducing leakage current of the DC input voltage Vdc caused by parasitic capacitance voltage.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A solar photovoltaic power conversion system converting a DC input voltage into an AC output voltage, the solar photovoltaic power conversion system comprising:
   an input capacitor bank having a first capacitor and a second capacitor, and the first capacitor and the second capacitor connected to a neutral point and configured to receive the DC input voltage;
   a first switching circuit connected in parallel to the input capacitor bank, and the first switching circuit having a first bridge arm and a second bridge arm connected in parallel to the first bridge arm;
   a second switching circuit connected in parallel to the input capacitor bank, and the second switching circuit having a third bridge arm and a fourth bridge arm connected in parallel to the third bridge arm;
   a first filtering circuit connected to the first switching circuit, and an output side of the first filtering circuit connected to the neutral point;

a second filtering circuit connected to the second switching circuit, and an output side of the second filtering circuit connected to the neutral point; and a control circuit configured to produce a plurality of control signals to control the first switching circuit and the second switching circuit, respectively, to reduce leakage current of the DC input voltage caused by parasitic capacitance voltage.

2. The solar photovoltaic power conversion system in claim 1, wherein the first capacitor and the second capacitor are connected to the neutral point to maintain a voltage across the first capacitor and a voltage across the second capacitor are equal to a half of the DC input voltage.

3. The solar photovoltaic power conversion system in claim 1, wherein the first bridge arm is composed of a first power switch and a first diode connected in series to the first power switch, and the second bridge arm is composed of a second power switch and a second diode connected in series to the second power switch; the third bridge arm is composed of a third power switch and a third diode connected in series to the third power switch, and the fourth bridge arm is composed of a fourth power switch and a fourth diode connected in series to the fourth power switch; the control circuit is configured to produce a first control signal, a second control signal, a third control signal, and a fourth control signal to correspondingly control the first power switch, the second power switch, the third power switch, and the fourth power switch.

4. The solar photovoltaic power conversion system in claim 3, wherein the control circuit comprises:
   a signal inverting unit;
   a first not gate unit;
   a second not gate unit;
   a first comparison unit having an inverting input terminal, a non-inverting input terminal, and an output terminal; wherein the non-inverting input terminal is configured to receive an AC output voltage signal provided from the AC output voltage and the inverting input terminal is configured to receive a triangular carrier signal; the output terminal is configured to output the first control signal, and the output terminal is connected to the first not gate unit to output the second control signal; wherein the triangular carrier signal is a high-frequency carrier signal; and
   a second comparison unit having an inverting input terminal, a non-inverting input terminal, and an output terminal; wherein the non-inverting input terminal is connected to the signal inverting unit and configured to receive the AC output voltage signal and the inverting input terminal is configured to receive the triangular carrier signal; the output terminal is configured to output the third control signal, and the output terminal is connected to the second not gate unit to output the fourth control signal.

5. The solar photovoltaic power conversion system in claim 4, wherein when the AC output voltage is under a positive half-cycle operation, the first control signal and the second control signal is a complementary high-frequency switching signal pair, and the third control signal and the fourth control signal is a complementary low-frequency signal pair; when the AC output voltage is under a negative half-cycle operation, the first control signal and the second control signal is a complementary low-frequency signal pair, and the third control signal and the fourth control signal is a complementary high-frequency switching signal pair.

6. The solar photovoltaic power conversion system in claim 4, wherein when the AC output voltage is under the positive half-cycle operation and the first output inductor and the fourth output inductor are under an energy-storing operation because the first power switch is turned on by the first control signal in the high-frequency switching manner and the fourth power switch is turned on by the fourth control signal in the low-frequency high-level manner, a positive half-cycle energy-storing loop is sequentially formed by the DC input voltage, the first power switch, the first output inductor, the AC output voltage, the fourth output inductor, the fourth power switch, and the DC input voltage.

7. The solar photovoltaic power conversion system in claim 4, wherein when the AC output voltage is under the positive half-cycle operation and the first output inductor and the fourth output inductor are under an energy-releasing operation because the first power switch is turned off by the first control signal in the high-frequency switching and the fourth power switch is turned on by the fourth control signal in the low-frequency high-level manner, a positive half-cycle energy-releasing loop is sequentially formed by the first output inductor, the AC output voltage, the fourth output inductor, the fourth power switch, the first diode, and the first output inductor.

8. The solar photovoltaic power conversion system in claim 4, wherein when the AC output voltage is under the negative half-cycle operation and the third output inductor and the second output inductor are under an energy-storing operation because the third power switch is turned on by the third control signal in the high-frequency switching manner and the second power switch is turned on by second control signal in the low-frequency high-level manner, a negative half-cycle energy-storing loop is sequentially formed by the DC input voltage, the third power switch, the third output inductor, the AC output voltage, the second output inductor, the second power switch, and the DC input voltage.

9. The solar photovoltaic power conversion system in claim 4, wherein when the AC output voltage is under the negative half-cycle operation and the third output inductor and the second output inductor are under an energy-releasing operation because the third power switch is turned off by the third control signal in the high-frequency switching manner and the second power switch is turned on by the second control signal in the low-frequency high-level manner, a negative half-cycle energy-releasing loop is sequentially formed by the third output inductor, the AC output voltage, the second output inductor, the second power switch, the third diode, and the third output inductor.

10. The solar photovoltaic power conversion system in claim 3, wherein the first filtering circuit has a first output inductor, a second output inductor, and a first output capacitor; the first output inductor has a first terminal and a second terminal, the second output inductor has a first terminal and a second terminal, and the first output capacitor has a first terminal and a second terminal; wherein the first terminal of the first output inductor is connected to the first terminal of the second output inductor and connected to the first terminal of the first output capacitor; the second terminal of the first output inductor is connected to the first power switch and the first diode, and the second terminal of the second output inductor is connected to the second power switch and the second diode; the second terminal of the first output capacitor is connected to the neutral point; the second filtering circuit has a third output inductor, a fourth output inductor, and a second output capacitor; the third output inductor has a first terminal and a second terminal, the fourth output inductor has a first terminal and a second terminal, and the second output capacitor has a first terminal and a second terminal; wherein the first terminal of the third output inductor is connected to the first terminal of the fourth output inductor and connected to the first terminal of the second output capacitor; the second terminal of the third output inductor is connected to the third power switch and the third diode, and the second terminal of the fourth output inductor is connected to the fourth power switch and the fourth diode; the second terminal of the second output capacitor is connected to the neutral point.

11. The solar photovoltaic power conversion system in claim 10, wherein the AC output voltage is outputted between the first terminal of the first output capacitor and the first terminal of the second capacitor.

12. A method of operating a solar photovoltaic power conversion system, the solar photovoltaic power conversion system converting a DC input voltage into an AC output voltage, the method comprising following steps:
  (a) providing an input capacitor bank to receive the DC input voltage; wherein the input capacitor bank has a first capacitor and a second capacitor, and the first capacitor and the second capacitor are connected to a neutral point;
  (b) providing a first switching circuit connected in parallel to the input capacitor bank; wherein the first switching circuit has a first bridge arm and a second bridge arm connected in parallel to the first bridge arm;
  (c) providing a second switching circuit connected in parallel to the input capacitor bank; wherein the second switching circuit has a third bridge arm and a fourth bridge arm connected in parallel to the third bridge arm;
  (d) providing a first filtering circuit; wherein the first filtering circuit is connected to the first switching circuit and an output side of the first filtering circuit is connected to the neutral point;
  (e) providing a second filtering circuit; wherein the second filtering circuit is connected to the second switching circuit and an output side of the second filtering circuit is connected to the neutral point; and
  (f) providing a control circuit to produce a plurality of control signals to control the first switching circuit and the second switching circuit, respectively, to reduce leakage current of the DC input voltage caused by parasitic capacitance voltage.

13. The method of operating the solar photovoltaic power conversion system in claim 12, wherein the first bridge arm is composed of a first power switch and a first diode connected in series to the first power switch, and the second bridge arm is composed of a second power switch and a second diode connected in series to the second power switch; the third bridge arm is composed of a third power switch and a third diode connected in series to the third power switch, and the fourth bridge arm is composed of a fourth power switch and a fourth diode connected in series to the fourth power switch; the control circuit is configured to produce a first control signal, a second control signal, a third control signal, and a fourth control signal to correspondingly control the first power switch, the second power switch, the third power switch, and the fourth power switch.

14. The method of operating the solar photovoltaic power conversion system in claim 13, wherein the first filtering circuit has a first output inductor, a second output inductor, and a first output capacitor; the first output inductor has a first terminal and a second terminal, the second output inductor has a first terminal and a second terminal, and the first output capacitor has a first terminal and a second terminal; wherein the first terminal of the first output inductor is connected to the first terminal of the second output inductor and connected to the first terminal of the first output capacitor; the second terminal of the first output inductor is connected to the first power switch and the first diode, and the second terminal of the second output inductor is connected to the second power switch and the second diode; the second terminal of the first output capacitor is connected to the neutral point; the second filtering circuit has a third output inductor, a fourth output inductor, and a second output capacitor; the third output inductor has a first terminal and a second terminal, the fourth output inductor has a first terminal and a second terminal, and the second output capacitor has a first terminal and a second terminal; wherein the first terminal of the third output inductor is connected to the first terminal of the fourth output inductor and connected to the first terminal of the second output capacitor; the second terminal of the third output inductor is connected to the third power switch and the third diode, and the second terminal of the fourth output inductor is connected to the fourth power switch and the fourth diode; the second terminal of the second output capacitor is connected to the neutral point.

15. The method of operating the solar photovoltaic power conversion system in claim 13, wherein the control circuit comprises:
  a signal inverting unit;
  a first not gate unit;
  a second not gate unit;
  a first comparison unit having an inverting input terminal, a non-inverting input terminal, and an output terminal; wherein the non-inverting input terminal is configured to receive an AC output voltage signal provided from the AC output voltage and the inverting input terminal is configured to receive a triangular carrier signal; the output terminal is configured to output the first control signal, and the output terminal is connected to the first not gate unit to output the second control signal; wherein the triangular carrier signal is a high-frequency carrier signal; and
  a second comparison unit having an inverting input terminal, a non-inverting input terminal, and an output terminal; wherein the non-inverting input terminal is connected to the signal inverting unit and configured to receive the AC output voltage signal and the inverting input terminal is configured to receive the triangular carrier signal; the output terminal is configured to output the third control signal, and the output terminal is connected to the second not gate unit to output the fourth control signal.

16. The method of operating the solar photovoltaic power conversion system in claim 15, wherein when the AC output voltage is under a positive half-cycle operation, the first control signal and the second control signal is a complementary high-frequency switching signal pair, and the third control signal and the fourth control signal is a complementary low-frequency signal pair; when the AC output voltage is under a negative half-cycle operation, the first control signal and the second control signal is a complementary low-frequency signal pair, and the third control signal and the fourth control signal is a complementary high-frequency switching signal pair.

17. The method of operating the solar photovoltaic power conversion system in claim 15, wherein when the AC output voltage is under the positive half-cycle operation and the first output inductor and the fourth output inductor are under an energy-storing operation because the first power switch is turned on by the first control signal in the high-frequency switching manner and the fourth power switch is turned on by the fourth control signal in the low-frequency high-level manner, a positive half-cycle energy-storing loop is sequentially formed by the DC input voltage, the first power switch, the first output inductor, the AC output voltage, the fourth output inductor, the fourth power switch, and the DC input voltage.

18. The method of operating the solar photovoltaic power conversion system in claim 15, wherein when the AC output voltage is under the positive half-cycle operation and the first output inductor and the fourth output inductor are under an energy-releasing operation because the first power switch is turned off by the first control signal in the high-frequency switching and the fourth power switch is turned on by the fourth control signal in the low-frequency high-level manner, a positive half-cycle energy-releasing loop is sequentially formed by the first output inductor, the AC output voltage, the fourth output inductor, the fourth power switch, the first diode, and the first output inductor.

19. The method of operating the solar photovoltaic power conversion system in claim 15, when the AC output voltage is under the negative half-cycle operation and the third output inductor and the second output inductor are under an energy-storing operation because the third power switch is turned on by the third control signal in the high-frequency switching manner and the second power switch is turned on by second control signal in the low-frequency high-level manner, a negative half-cycle energy-storing loop is sequentially formed by the DC input voltage, the third power switch, the third output inductor, the AC output voltage, the second output inductor, the second power switch, and the DC input voltage.

20. The method of operating the solar photovoltaic power conversion system in claim 15, wherein when the AC output voltage is under the negative half-cycle operation and the third output inductor and the second output inductor are under an energy-releasing operation because the third power switch is turned off by the third control signal in the high-frequency switching manner and the second power switch is turned on by the second control signal in the low-frequency high-level manner, a negative half-cycle energy-releasing loop is sequentially formed by the third output inductor, the AC output voltage, the second output inductor, the second power switch, the third diode, and the third output inductor.

* * * * *